(12) United States Patent
Takahara

(10) Patent No.: US 9,651,790 B2
(45) Date of Patent: May 16, 2017

(54) PRISM FOR PROJECTION OPTICAL SYSTEM AND OPTICAL SYSTEM HAVING SAME

(71) Applicant: Konica Minolta, Inc., Tokyo (JP)

(72) Inventor: Koji Takahara, Hirakata (JP)

(73) Assignee: Konica Minolta, Inc., Tokyo (JP)

( * ) Notice: Subject to any disclaimer, the term of this patent is extended or adjusted under 35 U.S.C. 154(b) by 35 days.

(21) Appl. No.: 14/560,491

(22) Filed: Dec. 4, 2014

(65) Prior Publication Data

US 2015/0160462 A1 Jun. 11, 2015

(30) Foreign Application Priority Data

Dec. 5, 2013 (JP) .................................. 2013-252225

(51) Int. Cl.
*G02B 27/12* (2006.01)
*G02B 5/04* (2006.01)
(Continued)

(52) U.S. Cl.
CPC .............. *G02B 27/126* (2013.01); *G02B 5/04* (2013.01); *G02B 27/145* (2013.01); *G03B 33/12* (2013.01);
(Continued)

(58) Field of Classification Search
CPC ........ G02B 1/115; G02B 1/11; G02B 27/142; G02B 13/16; G02B 27/126;
(Continued)

(56) References Cited

U.S. PATENT DOCUMENTS

| 7,329,004 B2* | 2/2008 | Arai ........................ G03B 21/28 349/9 |
| 2008/0239501 A1* | 10/2008 | Saita ......................... G02B 5/04 359/634 |
| 2009/0086167 A1* | 4/2009 | Yatsu .................. G03B 21/2073 353/20 |
| 2009/0103053 A1* | 4/2009 | Ichikawa ............. H04N 5/7458 353/33 |
| 2011/0109820 A1* | 5/2011 | Silverstein ......... G02B 27/1053 349/8 |

(Continued)

FOREIGN PATENT DOCUMENTS

JP H04-321001 A 11/1992
JP H10-20102 A 1/1998
(Continued)

OTHER PUBLICATIONS

Office Action issued in corresponding Japanese Application No. 2013-252225 dated Nov. 22, 2016, and English translation thereof (14 pages).

*Primary Examiner* — Scott J Sugarman
*Assistant Examiner* — Daniele Manikeu
(74) *Attorney, Agent, or Firm* — Osha Liang LLP

(57) ABSTRACT

A prism for a projection optical system included in a projector including an illumination light source, an illumination optical system, and a projection optical system, includes: a first surface that totally reflects a beam of one of the illumination light and the projection light and transmits a beam of the other; and a second surface that is opposed to the first surface with an air gap therebetween and transmits a beam passing through the first surface, wherein the first surface has an antireflective film having an average reflectivity of a s-polarized reflectivity and a p-polarized reflectivity at a center angle of a transmitted beam of 2% or lower in three wavelength ranges including a first wavelength range of blue, a second wavelength range of green, and a third wavelength range of red.

11 Claims, 13 Drawing Sheets

(51) Int. Cl.
   *G02B 27/14*     (2006.01)
   *G03B 33/12*     (2006.01)
   *G03B 21/00*     (2006.01)
   *G03B 21/20*     (2006.01)

(52) U.S. Cl.
   CPC ........ *G03B 21/008* (2013.01); *G03B 21/2033* (2013.01); *G03B 21/2066* (2013.01)

(58) Field of Classification Search
   CPC ........ G02B 2006/12114; G02B 27/285; G02B 5/045; G03B 33/12; G03B 21/10; G03B 21/008; G03B 21/2073; G03B 21/28
   USPC ....... 359/586, 359, 588, 589, 601, 580, 581, 359/443, 583, 484.01, 485.03, 634, 640, 359/639, 196.1, 460, 831, 832
   See application file for complete search history.

(56) References Cited

U.S. PATENT DOCUMENTS

2014/0078589 A1\* 3/2014 Fujii ........................ G02B 1/11
                                                              359/601

FOREIGN PATENT DOCUMENTS

| JP | 2002/107505 A | 4/2002 |
| JP | 2003/248103 A | 9/2003 |
| JP | 2004-191878 A | 7/2004 |
| JP | 2008-111889 A | 5/2008 |
| JP | 2010/096843 A | 4/2010 |

\* cited by examiner

FIG. 6A

| | REFRACTIVE INDEX (n) | THICKNESS (d) | OPTICAL FILM THICKNESS (nd) |
|---|---|---|---|
| Air | | | |
| $MgF_2$ | 1.38 | 120 | $0.30\lambda_0$ |
| $TiO_2+La_2O_3$ | 2.05 | 141 | $0.53\lambda_0$ |
| $Al_2O_3$ | 1.62 | 288 | $0.85\lambda_0$ |
| SUBSTRATE (BK7) | 1.52 | | |

DESIGNED DOMINANT WAVELENGTH $\lambda_0$ : 550 nm

{ $MgF_2$, $TiO_2+La_2O_3$, $Al_2O_3$ } = 7A

| | REFRACTIVE INDEX (n) | THICKNESS (d) | OPTICAL FILM THICKNESS (nd) |
|---|---|---|---|
| Air | | | |
| $MgF_2$ | 1.38 | 114 | $0.29\lambda_0$ |
| $TiO_2+La_2O_3$ | 2.05 | 108 | $0.40\lambda_0$ |
| $MgF_2$ | 1.38 | 23 | $0.06\lambda_0$ |
| $TiO_2+La_2O_3$ | 2.05 | 20 | $0.07\lambda_0$ |
| $Al_2O_3$ | 1.62 | 102 | $0.30\lambda_0$ |
| $TiO_2+La_2O_3$ | 2.05 | 137 | $0.51\lambda_0$ |
| $Al_2O_3$ | 1.62 | 91 | $0.27\lambda_0$ |
| SUBSTRATE (BK7) | 1.52 | | |

DESIGNED DOMINANT WAVELENGTH $\lambda_0$: 550 nm

FIG. 9A

| | REFRACTIVE INDEX (n) | THICKNESS (d) | OPTICAL FILM THICKNESS (nd) |
|---|---|---|---|
| Air | | | |
| MgF$_2$ | 1.38 | 108 | 0.27 $\lambda_0$ |
| TiO$_2$+La$_2$O$_3$ | 2.05 | 115 | 0.43 $\lambda_0$ |
| MgF$_2$ | 1.38 | 27 | 0.07 $\lambda_0$ |
| TiO$_2$+La$_2$O$_3$ | 2.05 | 15 | 0.06 $\lambda_0$ |
| Al$_2$O$_3$ | 1.62 | 102 | 0.30 $\lambda_0$ |
| TiO$_2$+La$_2$O$_3$ | 2.05 | 132 | 0.49 $\lambda_0$ |
| Al$_2$O$_3$ | 1.62 | 85 | 0.25 $\lambda_0$ |
| SUBSTRATE (BK7) | 1.52 | | |

DESIGNED DOMINANT WAVELENGTH $\lambda_0$ : 550 nm

PRISM FOR PROJECTION OPTICAL SYSTEM AND OPTICAL SYSTEM HAVING SAME

The entire disclosure of Japanese Patent Application No. 2013-252225 filed on Dec. 5, 2013 including description, claims, drawings, and abstract are incorporated herein by reference in its entirety.

BACKGROUND OF THE INVENTION

Field of the Invention

The present invention relates to a prism for a projection optical system included in a projector, and in particular to a prism for a projection optical system suitable for a projector having a laser light source as an illumination light source and an optical system having the same.

Description of the Related Art

Projectors having image display devices such as reflective liquid crystal panels and DMDs (digital micro-mirror devices) have been known as apparatuses for projecting digital information such as video contained in video recorders and documents and images contained in personal computers. Such a projector includes an illumination light source configured to radiate illumination light, an illumination optical system configured to guide illumination light from the illumination light source to image display devices, and a projection optical system configured to guide projection light from the image display devices to a projection lens.

The illumination light emitted from the illumination light source is guided and split into light rays of three colors of red, blue, and green through the illumination optical system, and applied to the image display devices associated with the respective colors. The illumination light rays applied to the image display devices are emitted as projection light rays by the image display devices, and the projection light rays are combined again, guided to the projection lens and projected onto a screen.

In addition, a prism (also referred to as a total internal reflection prism: TIR prism) for a projection optical system is used to totally reflect either one of the illumination light and the projection light and transmit the other. Specifically, the prism for a projection optical system is an optical member used for both of an optical system for guiding illumination light and an optical system for guiding projection light, and includes a combination of multiple triangular prisms. Furthermore, the prisms are combined in a manner that the prisms are opposed with an air gap formed therebetween, and optical paths are set so that surfaces in contact with the air gap totally reflect illumination light and transmit projection light.

For the illumination light source, high-intensity xenon lamps, high-pressure mercury lamps, and the like are used in the related art. In recent years, LEDs (light emitting diodes) and laser light sources using semiconductor lasers have been in practical use with improvement in luminous efficiency and increase in the amount of luminescence. In particular, since blue laser light sources are developed, light sources for illumination light using light sources of three primary colors, which are the blue laser light sources, green laser light sources, and red laser light sources, have been developed.

If light (projection light, for example) passing through a surface in contact with the air gap of the prism for the projection optical system is partly reflected, light leaks into the prism, which not only degrades light use efficiency but may also damage optical components, adhesives, and the like owing to heat caused by unnecessary reflected light. In particular, when a laser light source with high power output is used, the degree of heat due to unnecessary reflective light becomes high, which is undesirable.

Thus, a prism system provided with a pitch periodic structure smaller than the wavelength of incident light on a surface (a total internal reflection surface, for example) in contact with an air gap to suppress reflection and improve light transmission characteristics at the air interface and a projection display device having the same have already been proposed (refer to JP 2004-191878 A, for example). In addition, an image projection system including an illumination light source having laser light sources of three primary colors of blue, green, and red, light combining unit, a total internal reflection prism, and a reflective image display device has already been proposed (refer to JP 2008-111889 A, for example).

In an optical system using a prism for a projection optical system, it is desirable to lower the reflectivity of light emitted to an air gap after passing through the prism and the reflectivity of light (projection light, for example) entering the prism from the air gap to ensure light transmission. If light to be transmitted is partly reflected, the reflected quantity is a loss in the light quantity and the light use efficiency lowers, which is a problem.

In general, since the reflectivity of light incident at a high angle is high, the reflectivity of projection light is desired to be lower in such a configuration as a prism for projection optical system in which projection light enters and exits at relatively high angles.

In particular, when high power output laser light is used as illumination light, even if only part of light to be transmitted is reflected, there are concerns about damages on optical components and adhesives due to heating by unnecessary reflected light and image degradation due to multiple reflection in an air gap because of high power, which is further a problem.

The optical system disclosed in JP 2004-191878 A provides the pitch periodic structure smaller than the wavelength of incident light on the surface in contact with the air gap to suppress reflection and improve the light transmission characteristic at the air interface. To provide such a periodic structure, however, not only a special process is required but also it is difficult to clean dirt or the like, if any, adhered on a surface after production, which is disadvantageous in cost and manufacturing processes.

The optical system disclosed in JP 2008-111889 A prevents unnecessary light from the image display device from entering a dichroic film but applies a split process thereto to improve the contrast of a projected image. Sufficient consideration, however, is not given to suppressing unnecessary reflection when projection light passes through a total internal reflection surface to suppress unnecessary heating and improve light use efficiency.

SUMMARY OF THE INVENTION

The present invention has been made in view of the aforementioned circumstances and an object thereof is to provide a prism for a projection optical system capable of controlling problems due to unnecessary reflected light by reducing reflection of light passing through the prism and improving light use efficiency in an optical system including an illumination light source configured to radiate laser light and the prism for a projection optical system, and the optical system having the prism.

To achieve at least one of the above-mentioned objects, according to an aspect, a prism for a projection optical system reflecting one aspect of the present invention included in a projector including: an illumination light source configured to emit laser light rays of blue, green, and red; an illumination optical system configured to guide illumination light from the illumination light source to an image display device; and a projection optical system configured to project projection light from the image display device onto a screen through a projection lens comprises: a first surface that totally reflects a beam of one of the illumination light and the projection light and transmits a beam of the other; and a second surface that is opposed to the first surface with an air gap therebetween and transmits a beam passing through the first surface, wherein the first surface has an antireflective film having an average reflectivity of a s-polarized reflectivity and a p-polarized reflectivity at a center angle of the projection light of 2% or lower in three wavelength ranges including a first wavelength range of blue, a second wavelength range of green, and a third wavelength range of red.

According to the configuration described above, since the illumination light source radiate laser light in the predetermined wavelength ranges, the first wavelength range of blue, the second wavelength range of green, and the third wavelength range of red each have a specific wavelength range. It is therefore obvious that light rays in the wavelength ranges of the beam (illumination light, for example) totally reflected by the total internal reflection surface (first surface) and the beam passing through the first surface are mainly of light rays in the respective specific wavelength ranges. Thus, generation of unnecessary reflected light can be suppressed by reducing reflectivity for the ranges corresponding to the specific wavelength ranges. Specifically, it is possible to obtain a prism for a projection optical system capable of reducing reflection of light passing through the prism to suppress problems caused by unnecessary reflected light and improve light use efficiency.

In the prism for a projection optical system, the second surface is also preferably provided with an antireflective film. According to such a configuration, generation of unnecessary reflected light can be suppressed by lowering the reflectivity of light passing through the second surface opposed to the first surface with the air gap therebetween. Image degradation due to multiple reflection or the like in the air gap can therefore be suppressed.

In the prism for a projection optical system, the first wavelength range of blue preferably ranges from 440 to 470 nm, the second wavelength range of green preferably ranges from 520 to 550 nm, and the third wavelength range of red preferably ranges from 630 to 660 nm. According to such a configuration, various laser light sources obtained by wavelength conversion on outputs from semiconductor lasers by using nonlinear crystals can be applied in addition to semiconductor lasers, LEDs and the like configured to emit light in predetermined wavelength ranges.

In the prism for a projection optical system, each of the antireflective films is preferably a dielectric multilayer having layers of three different refractive indices of high, medium, and low refractive indices, includes a laminate of a first layer made of a medium-refractive-index material, a second layer made of a high-refractive-index material, a third layer made of the medium-refractive-index material, a fourth layer made of the high-refractive-index material, a fifth layer made of a low-refractive-index material, a sixth layer made of the high-refractive-index material, and a seventh layer made of the low-refractive-index material in this order from a substrate, and satisfies the following conditions (1) and (2) where a center wavelength of the used wavelength ranges is a designed dominant wavelength: Condition (1): $1.48 < n_S < 1.56$, $1.36 < n_L < 1.40$, $1.58 < n_M < 1.66$, and $1.95 < n_H < 2.15$ where $n_S$ represents the refractive index of a substrate glass, $n_L$ represents the refractive index of the low-refractive-index material for the designed dominant wavelength, $n_M$ represents the refractive index of the medium-refractive-index material for the designed dominant wavelength, and $n_H$ represents the refractive index of the high-refractive-index material for the designed dominant wavelength; and Condition (2): $0.21\lambda_0 \le n_M \cdot d_1 \le 0.34\lambda_0$, $0.48\lambda_0 \le n_H \cdot d_2 \le 0.55\lambda_0$, $0.27\lambda_0 \le n_M \cdot d_3 \le 0.37\lambda_0$, $0.04\lambda_0 \le n_H \cdot d_4 \le 0.12\lambda_0$, $0.03\lambda_0 \le n_L \cdot d_5 \le 0.07\lambda_0$, $0.32\lambda_0 \le n_H \cdot d_6 \le 0.44\lambda_0$, and $0.27\lambda_0 \le n_L \cdot d_7 \le 0.30\lambda_0$ where $\lambda_0$ represents the designed dominant wavelength of 550 nm and $d_1$ to $d_7$ represent the physical thicknesses (nm) of the first to seventh layers. According to such a configuration, the dielectric multilayer capable of reducing unnecessary reflected light in the predetermined wavelength ranges radiated by the illumination light source can be formed.

In the prism for a projection optical system, the medium-refractive-index material is preferably $Al_2O_3$, the low-refractive-index material is preferably $MgF_2$, and the high-refractive-index material is preferably a mixture of $TiO_2$ and $La_2O_3$. According to such a configuration, materials having refractive indices preferable for forming a dielectric multilayer suitable for laser light in the predetermined wavelength ranges radiated by the illumination light source can be obtained.

In the prism for a projection optical system, the medium-refractive-index material is preferably $Al_2O_3$, the low-refractive-index material is preferably $MgF_2$, and the high-refractive-index material is preferably $TiZrO_4$. According to such a configuration, materials having refractive indices preferable for forming a dielectric multilayer suitable for laser light in the predetermined wavelength ranges radiated by the illumination light source can be easily obtained.

In the prism for a projection optical system, an angle of incidence of a beam passing through the second surface is preferably 56° when a substrate glass of the prism for a projection optical system has a refractive index of 1.52. According to such a configuration, the reflectivity of the projection light incident via the air gap can be minimized and generation of unnecessary reflected light by the second surface that is a projection light entrance surface can be successfully suppressed.

Furthermore, to achieve at least one of the above-mentioned objects, according to an aspect, an optical system having the prism for a projection optical system having the configuration as described above is provided. According to such a configuration, since the prism for a projection optical system having the antireflective films having a reflectivity of 2% or lower in the three wavelength ranges including the first wavelength range of blue, the second wavelength range of green, and the third wavelength range of red is used, it is possible to obtain an optical system including the illumination light source configured to radiate laser light and the prism for a projection optical system and capable of reducing reflection of light passing through the prism to effectively use laser light radiated by the illumination light source.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6A is an explanatory table showing a configuration of an antireflective film of the related art;

FIG. 9A is an explanatory table showing a configuration of an antireflective film of Example 3 according to an embodiment of the present invention.

DESCRIPTION OF THE PREFERRED EMBODIMENTS

Figure 1:
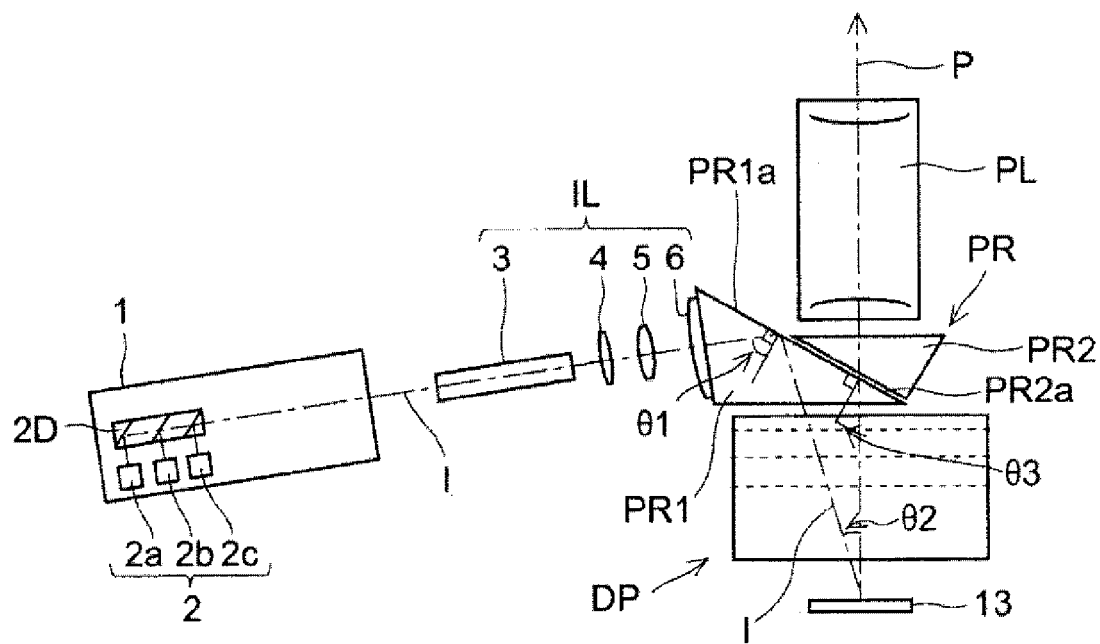
FIG. 1 is a schematic explanatory diagram showing an outline of a first embodiment of an optical system having a prism for a projection optical system according to the embodiment of the present invention.

Hereinafter, an embodiment of the present invention will be described with reference to the drawings. However, the scope of the invention is not limited to the illustrated examples.

Embodiments of the present invention will be described below with reference to the drawings; the present invention, however, is not limited thereto. Components having the same configurations will be designated by the same reference numerals and redundant description will not be repeated as appropriate.

A prism for a projection optical system and an optical system having the prism for the projection optical system according to an embodiment of the present invention are an optical system for a projector and a prism for a projection optical system suitably applied to a projector, for example. Furthermore, the prism and the optical system are suitably applied to a projector using laser light as an illumination light source.

Examples of the optical system applied to a projector include an optical system using a dichroic prism that is a light splitting and combining prism in addition to a prism for a projection optical system and an optical system only using a prism for a projection optical system without using any dichroic prism. Thus, a first embodiment will be described referring to an optical system using a prism for a projection optical system and a dichroic system and a second embodiment will be described referring to an optical system using only a prism for a projection optical system.

First Embodiment

For example, an optical system according the first embodiment shown in FIG. 1 includes an illumination optical system IL configured to guide illumination light I from an illumination light source 1 configured to radiate laser light, a prism PR for a projection optical system, a dichroic prism DP, an image display device 13, and a projection optical system PL configured to guide projection light P from the image display device 13 to a projection screen.

The illumination light source 1 includes a laser light source 2 having semiconductor lasers of three primary colors including a blue laser light source 2a configured to emit blue light in a first wavelength range, a green laser light source 2b configured to emit green light in a second wavelength range, and a red laser light source 2c configured to emit red light in a third wavelength range, for example. Laser light rays from the multiple light sources are combined into one illumination light ray I via a light combining unit 2D. The light combining unit 2D may be a conventionally known device combining dichroic mirrors that reflect light rays of respective colors, for example.

The illumination light I radiated by the illumination light source 1 is incident on the prism PR for a projection optical system, totally reflected toward the dichroic prism DP by a surface PR1a, and incident on the image display device 13 from the dichroic prism DP. Furthermore, light modulated by the image display device 13 is emitted as projection light toward the dichroic prism DP, passes through the dichroic prism DP and the prism PR for a projection optical system and is projected onto a screen, which is not shown, via the projection optical system PL.

Note that the illumination optical system IL includes a rod integrator 3, a condenser lens 4, and a relay lens 5, for example. Laser light from the illumination light source 1 enters the rod integrator 3, repeats internal reflection therein, exits with uniform light quantity distribution, passes through the condenser lens 4 and the relay lens 5, and is incident on the prism PR for a projection optical system via an entrance lens 6 arranged on the incident side of the prism (total internal reflection prism) PR for a projection optical system.

The prism PR for a projection optical system includes a substantially triangular first prism PR1 and a substantially triangular second prism PR2 with an air gap between opposed inclined surfaces thereof, for example. The prism PR for a projection optical system separates input light and output light to and from the image display device 13. The first prism PR1 totally reflects illumination light I from the illumination optical system IL by a surface PR1a, so that the illumination light I is incident on the dichroic prism DP.

The dichroic prism DP splits the illumination light I into the respective colors of red, green, and blue, and combines the light rays of the respective colors modulated by the image display device 13.

Figure 2:
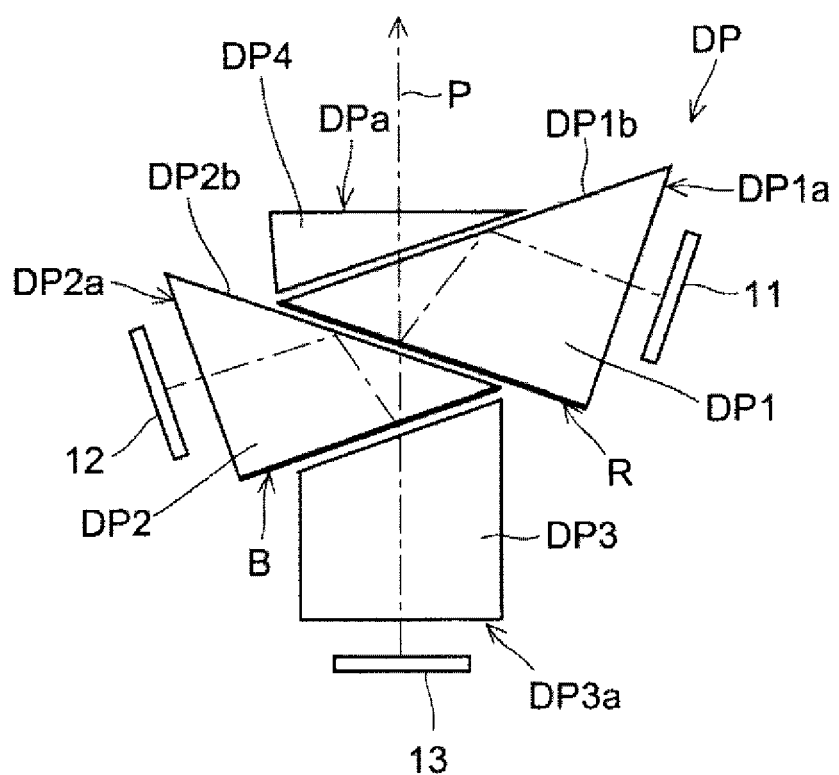
FIG. 2 is a vertical cross-sectional view of a dichroic prism included in the optical system of FIG. 1.

Next, an example of the dichroic prism DP will be described with reference to FIG. 2. The dichroic prism DP includes a combination of a substantially triangular first prism DP1, a substantially triangular second prism DP2, a substantially quadrangular third prism DP3, and a substantially triangular clear prism DP4. A surface of the first prism DP1 facing the second prism DP2 functions as a dichroic surface, and a dichroic film R that reflects red light is formed on this surface. Note that an air gap is provided between the first prism DP1 and a second prism DP2. In addition, a surface of the second prism DP2 facing the third prism DP3 functions as a dichroic surface, and a dichroic film B that reflects blue light is formed on this surface.

An air gap is also provided between the second prism DP2 and the third prism DP3. Note that the positions where the dichroic film R and the dichroic film B are formed may be reversed. Although the clear prism DP4 is used in the dichroic prism DP in the present embodiment, the clear prism DP4 may be omitted.

A red ray of illumination light I incident on an entrance/exit surface DPa that is a top surface of the clear prism DP4 is reflected by the dichroic film R, and the other blue and green rays thereof pass through the dichroic film R. The red ray reflected by the dichroic film R is totally reflected by a side surface DP1b of the first prism DP1, exits through an entrance/exit surface DP1a of the first prism DP1, and illuminates an image display device 11 for red. Note that reflective liquid crystal display devices as well as DMDs may be used for the image display devices.

As for the blue ray and the green ray passing through the dichroic film R, the blue ray is reflected by the dichroic film B of the second prism DP2 and the green ray passes therethrough. The blue ray reflected by the dichroic film B is totally reflected by a side surface DP2b of the second prism DP2, exits through an entrance/exit surface DP2a of the second prism DP2, and illuminates an image display device (DMD) 12 for blue. The green ray passing through the dichroic film B exits through an entrance/exit surface DP3a of the third prism DP3, and illuminates the image display device (DMD) 13 for green.

When a DMD is used for the image display device, micromirrors (not shown) of respective DMD pixels are tilted at ±12°. In a state where the micromirrors are tilted at 12° toward the optical axis of the illumination light I, the illumination light incident at an angle of incidence $\theta2=24°$ is emitted as projection light (ON light) in the direction perpendicular to the DMD (the optical axis direction of the projection light P). In contrast, in a state where the micromirrors are tilted at 12° in the direction opposite to the optical axis of the illumination light I, the illumination light is emitted as OFF light at an exit angle of 48°. Optical modulation is carried out in this manner.

Next, optical paths of projection light rays from the image display devices (DMDs), that is, combining of light rays will be described. A red projection light ray reflected by the image display device 11 for red is incident on the entrance/exit surface DP1a of the first prism DP1, totally reflected by the side surface DP1b of the first prism DP1, and is then further reflected by the dichroic film R. A blue projection light ray reflected by the image display device 12 for blue is incident on the entrance/exit surface DP2a of the second prism DP2, totally reflected by the side surface DP2b of the second prism DP2, and is then further reflected by the dichroic film B. The blue projection light ray then further passes through the dichroic film R of the first prism DP1. The green projection light ray reflected by the image display device 13 for green is incident on the entrance/exit surface DP3a of the third prism DP3, and passes through the dichroic film B and the dichroic film R.

The projection light rays of red, blue, and green are combined into one projection light ray P having one optical axis, exit through the entrance/exit surface DPa of the clear prism DP4 and enters the TIR prism PR. Subsequently, since the combined projection light P does not satisfy total internal reflection conditions for the respective prisms in the prism PR for a projection optical system, the projection light P passes through the prism PR for a projection optical system PR and the air gap, and is projected onto a screen, which is not shown, by the projection optical system PL including multiple lenses, etc. Note that the lenses, etc. of the projection optical system PL are not shown.

Figure 3:
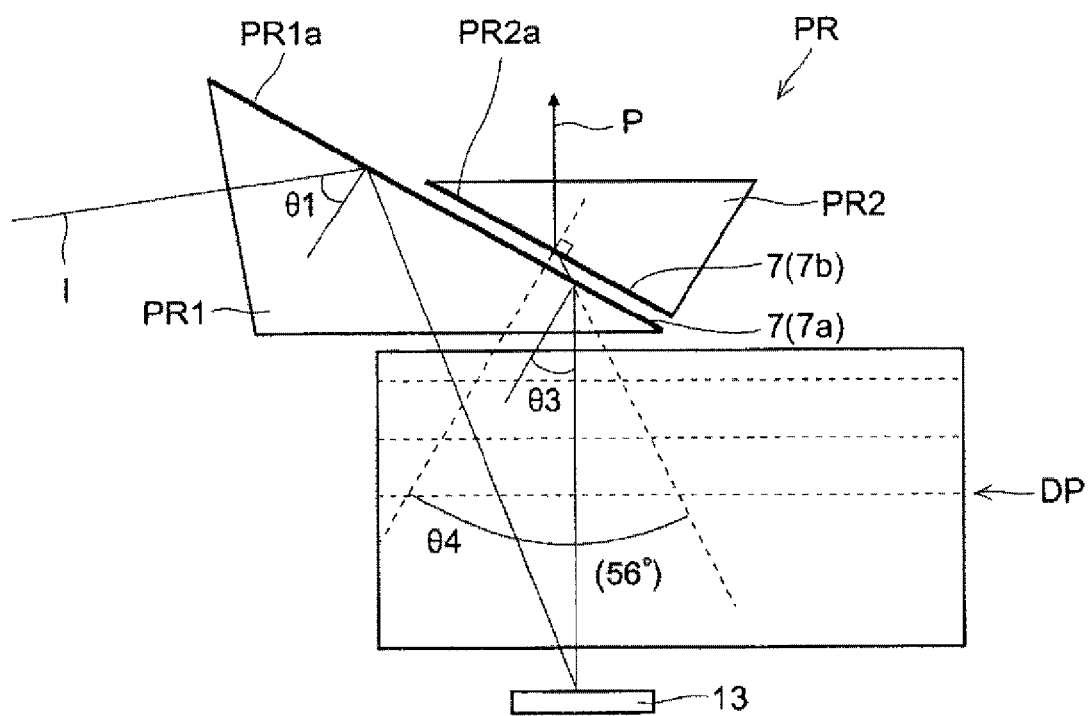
FIG. 3 is a schematic cross sectional view of the prism for the projection optical system of FIG. 1.

Next, a configuration in which illumination light I enters the prism PR for a projection optical system and projection light P exits therefrom will be described in more detail with reference to FIG. 3.

The prism PR for a projection optical system according to the present embodiment has the surface PR1a that reflects the illumination light I. The surface PR1a transmits the projection light P. Furthermore, the prism PR for a projection optical system has a surface PR2a opposed to the surface PR1a with the air gap therebetween, and the projection light P exiting through the surface PR1a passes through the surface PR2a.

Specifically, the prism PR for a projection optical system has a first surface (corresponding to the surface PR1a in the present embodiment) that totally reflects the beam of one of the illumination light I and the projection light P and transmits the beam of the other, and a second surface (corresponding to the surface PR2a in the present embodiment) that is opposed to the first surface with an air gap therebetween and transmits the beam passing through the first surface. The surface PR1a totally reflects the illumination light I and transmits the projection light P, which can be realized by setting the angle of incidence $\theta1$ of the illumination light I with respect to the surface PR1a to be equal to or larger than a total internal reflection angle and setting the angle of incidence $\theta3$ of the projection light P with respect to the surface PR1a to be smaller than the total internal reflection angle.

Furthermore, since the surface PR1a is a surface that transmits the projection light P, an antireflective film 7 (7a) is provided on the surface in the present embodiment. The reflectivity of the surface can thus be reduced when the projection light P passes therethrough to prevent generation of unnecessary reflected light. If unnecessary reflected light is generated, light leaks into the prism, which not only degrades light use efficiency but may also damage optical components, adhesives, and the like owing to heat caused by the unnecessary reflected light.

In particular, when high power output laser light is used as the illumination light, even if only part of light to be transmitted is reflected, there are concerns about damages on optical components and adhesives due to heating by the unnecessary reflected light and image degradation due to multiple reflection in the air gap because of high power, which is further a problem.

Furthermore, since the projection light P contains a blue ray in the first wavelength range, a green ray in the second wavelength range, and a red ray in the third wavelength range, the antireflective film 7 (7a) preferably has an antireflecting function (in other words, low reflectivity) effective for light rays of the wavelength ranges and does not need to have low reflectivity for light rays in the other wavelength ranges.

For example, laser light radiated by the illumination light source 1 preferably has the first wavelength range of blue from 440 to 470 nm, the second wavelength range of green from 520 to 550 nm, and the third wavelength range of red from 630 to 660 nm. With such a configuration, various laser light sources obtained by wavelength conversion on outputs from semiconductor lasers by using nonlinear crystals can be applied in addition to semiconductor lasers, LEDs and the like configured to emit light in predetermined wavelength ranges.

For example, a blue semiconductor laser at about 445 nm or a laser at 465 nm obtained by wavelength conversion of a semiconductor laser at 930 nm by using nonlinear crystals is often used for the blue laser light source, a green semiconductor laser at about 525 nm or 545 nm or a laser at 532 nm obtained by wavelength conversion of laser light at 1064 nm by using nonlinear crystals is often used for the green, and a red semiconductor laser in a wavelength range of about 630 to 660 nm is often used for the red.

Thus, in the present embodiment, the antireflective film 7 capable of suitably reducing the reflectivity of light rays in the first wavelength range from 440 to 470 nm, the second wavelength range from 520 to 550 nm, and the third wavelength range from 630 to 660 nm is applied.

The antireflective film 7 is preferably provided on the surface PR2a corresponding to the second surface in addition to the surface PR1a corresponding to the first surface. This is because the reflectivity increases with the angle of incidence when light (projection light P) is incident at an angle with respect to a surface such as the surface PR1a and the surface PR2a. With the configuration in which the antireflective film 7 (7b) is provided on the surface PR2a corresponding to the second surface, the reflectivity of the projection light P can be low even when the projection light P is incident at a certain angle of incidence, which can suppress generation of unnecessary reflected light. It is therefore possible to suppress light leaking into the air gap and prevent image degradation due to multiple reflection or the like in the air gap between the first surface and the second surface.

Furthermore, in order to make the reflectivity at the surface PR2a as small as possible, the angle of incidence θ4 of a beam passing through the surface, that is the projection light P, with respect to the surface PR2a is set to 56°. This is because the reflectivity can be minimized if the angle of incidence θ4 of the projection light with respect to a projection light entrance surface is 56° when the refractive index of a substrate glass is 1.52. With such a configuration, the reflectivity of the projection light P incident via the air gap can be minimized and generation of unnecessary reflected light by the surface PR2a can be successfully suppressed.

Second Embodiment

Figure 4:
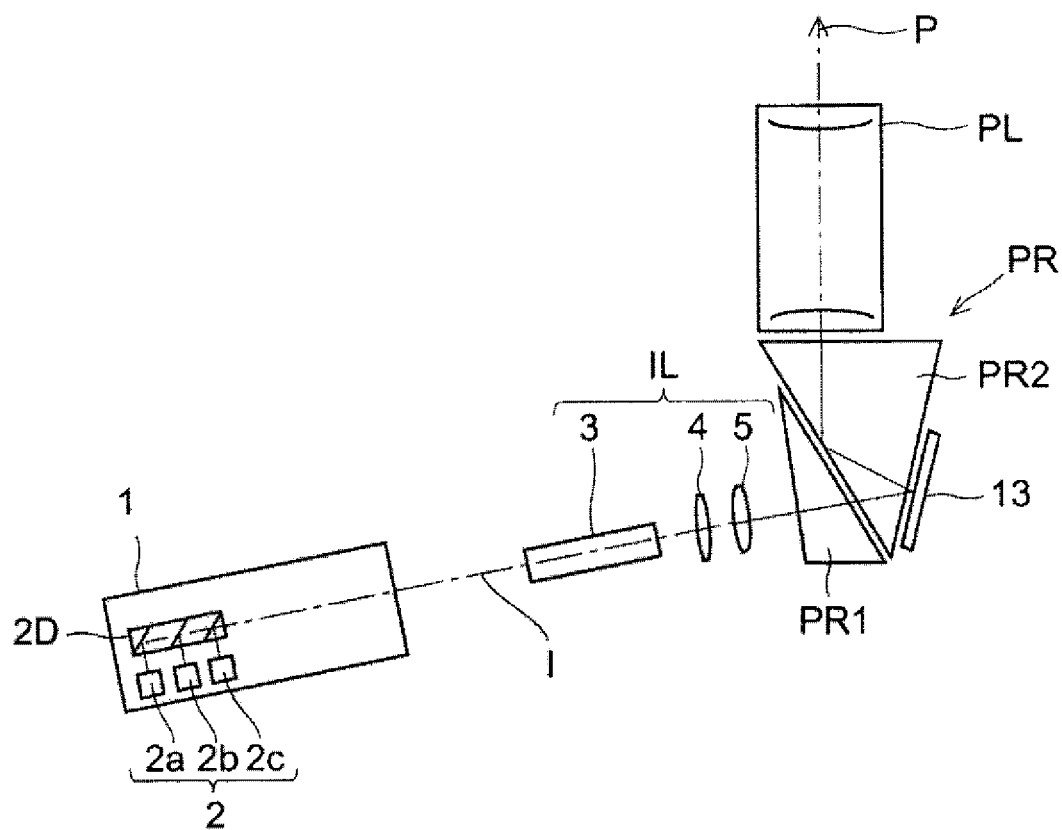
FIG. 4 is a schematic explanatory diagram showing an outline of a second embodiment of an optical system having a prism for a projection optical system according to the embodiment of the present invention.
Figure 5:
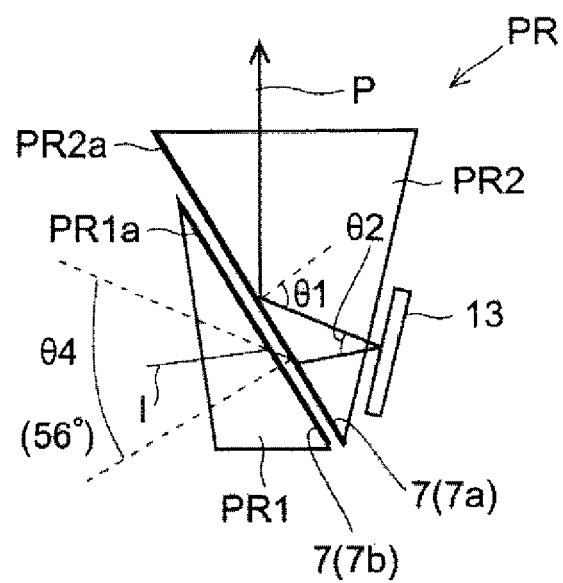
FIG. 5 is a vertical cross-sectional view of the prism for the projection optical system of FIG. 4.

Next, an optical system using only a prism for a projection optical system will be describe as a second embodiment with reference to FIGS. 4 and 5. The present embodiment is what is called a single-chip optical system configured to display a three-color image by using one image display device 13. Components having the same configurations as those in the first embodiment will be described using the same reference numerals.

The optical system of the present embodiment also includes an illumination light source 1 having a laser light source 2 including semiconductor lasers of three primary colors, an illumination optical system IL, a prism PR for a projection optical system, an image display device 13, and a projection optical system PL.

The prism PR for a projection optical system according to the present embodiment also includes a first prism PR1 on which illumination light I is incident and a second prism PR2 from which projection light P exits, and an air gap is provided between opposed inclined surfaces thereof. In the present embodiment, however, it is the second prism PR2 that has a total internal reflection surface, and the first prism PR1 transmits the illumination light I while the second prism PR2 transmits the illumination light I and totally reflects the projection light P.

Specifically, in the prism PR for a projection optical system, it can be deemed that the surface PR2a of the second prism PR2 corresponds to the first surface that totally reflects the beam of one of the illumination light I and the projection light P and transmits the beam of the other, and that the surface PR1a of the first prism PR1 corresponds to the second surface that is opposed to the first surface with an air gap therebetween and transmits the beam passing through the first surface.

Thus, similarly to the prism PR for a projection optical system of the first embodiment, the prism PR for a projection optical system according to the present embodiment is a prism PR for a projection optical system having a first surface that totally reflects the beam of one of the illumination light I and the projection light P and transmits the beam of the other, and a second surface that is opposed to the first surface with an air gap therebetween and transmits the beam passing through the first surface.

Furthermore, in the present embodiment, the laser light source 2 capable of pulse oscillation is used and the laser emission and the DMD are synchronized with each other to express all the colors by one DMD without using any color splitting and combining prism. Specifically, a large number of micromirrors included in the image display device 13 that is a DMD are driven in synchronization with oscillation driving of the respective colors, which allows a color image to be displayed by using one image display device 13. Furthermore, when a continuous wave laser is used instead of the pulsed laser oscillator, a color image can also be displayed by providing a color wheel between the illumination optical system and the prism PR of a projection optical system and synchronizing the color wheel with the DMD.

In the prism PR for a projection optical system according to the present embodiment as shown in FIG. 5, since the surface PR2a corresponds to the first surface that totally reflects the beam of one of the illumination light I and the project ion light P and transmits the beam of the other, the angle of incidence θ1 of the projection light P to be totally reflected with respect to the surface PR2a is set to be equal to or larger than the total internal reflection angle. Similarly, in order to make the reflectivity of the illumination light passing through the surface PR2a as small as possible, the angle of incidence θ4 of a beam passing through the surface, that is the illumination light I incident via the air gap, with respect to the surface PR2a is also set to 56°.

Similarly, antireflective films 7 (7a, 7b) are also provided on the first surface that totally reflects the beam of one of the illumination light I and the projection light P and transmits the beam of the other and on the second surface that is opposed to the first surface with the air gap therebetween and transmits the beam passing through the first surface. Thus, in the second embodiment, the antireflective film 7 (7a) is provided on the surface PR2a and the antireflective film 7 (7b) is provided on the surface PR1a.

With the configuration described above, the light reflectivity can be low even when a beam passing through the surface is incident at a certain angle of incidence, which can suppress generation of unnecessary reflected light. Problems caused by unnecessary reflected light can therefore be suppressed and the light use efficiency can be improved by reducing reflection of light passing through the prism.

Similarly, the antireflective films 7 (7a, 7b) are also antireflective films 7 capable of suitably reducing reflectivity of light in the first wavelength range from 440 to 470 nm, the second wavelength range from 520 to 550 nm, and the third wavelength range from 630 to 660 nm according to the wavelength of the beam passing therethrough.

As described above, the antireflective films 7 (7a, 7b) according to the first and second embodiments, has an antireflecting function (in other words, low reflectivity) effective for a blue ray in the first wavelength range, a green ray in the second wavelength range, and a red ray in the third wavelength range emitted by the laser light source 1. It is clearly not a problem if the antireflective films 7 (7a, 7b) do not have low reflectivity, or in other words, if the antireflective films 7 (7a, 7b) have high reflectivity for light rays in the other wavelength ranges.

The antireflective films 7 (7a, 7b) are made of a dielectric multilayer that is a laminate of multiple dielectric films. A conventionally known method such as a vacuum vapor deposition method, an IAD (ion assisted deposition) method, an IP (ion plating) method, and a sputtering method can be used for the method for forming the dielectric multilayer. A typical antireflective film of the related art is made of a dielectric multilayer having about three or five layers so that reflection can be reduced in the entire visible light range of 400 to 700 nm.

Next, an antireflective film 7A (Comparative Example) made of a dielectric multilayer having a configuration of the related art, configurations of the antireflective film 7 (Examples 1, 2, and 3) according to the present embodiment and the reflectivities thereof will be described sequentially. A process of forming the antireflective films 7, 7A is the vacuum vapor deposition method under heating at 300° C. by using BK7 produced by Schott AG as a substrate glass. Furthermore, the reflectivity used for comparison is an average reflectivity of a s-polarized reflectivity and a p-polarized reflectivity at an angle of incidence of 56°.

Comparative Example

An antireflective film 7A made of a dielectric multilayer of a configuration of the related art having three layers will be described as an example with reference to FIGS. 6A and 6E. FIG. 6A shows the configuration and the characteristics of the antireflective film 7A of the related art that is a comparative example, and FIG. 65 shows the reflectivity of the antireflective film 7A.

As shown in FIG. 6A, the antireflective film 7A of the related art (Comparative Example) includes, on a glass substrate, a laminate of $Al_2O_3$ having a refractive index of 1.62 and a thickness of 288 nm as a first layer, a mixed film of $TiO_2$ and $La_2O_3$ having a refractive index of 2.05 and a thickness of 141 nm as a second layer, and $MgF_2$ having a refractive index of 1.38 and a thickness of 120 nm as a third layer.

The substrate glass is conventionally known BK7 produced by Schott AG and has a refractive index of 1.52. FIG. 6A also shows the ratio of the optical film thickness (refractive index×thickness) corresponding to each thickness d to a designed dominant wavelength $\lambda_0$ (550 nm).

Figure 6B:
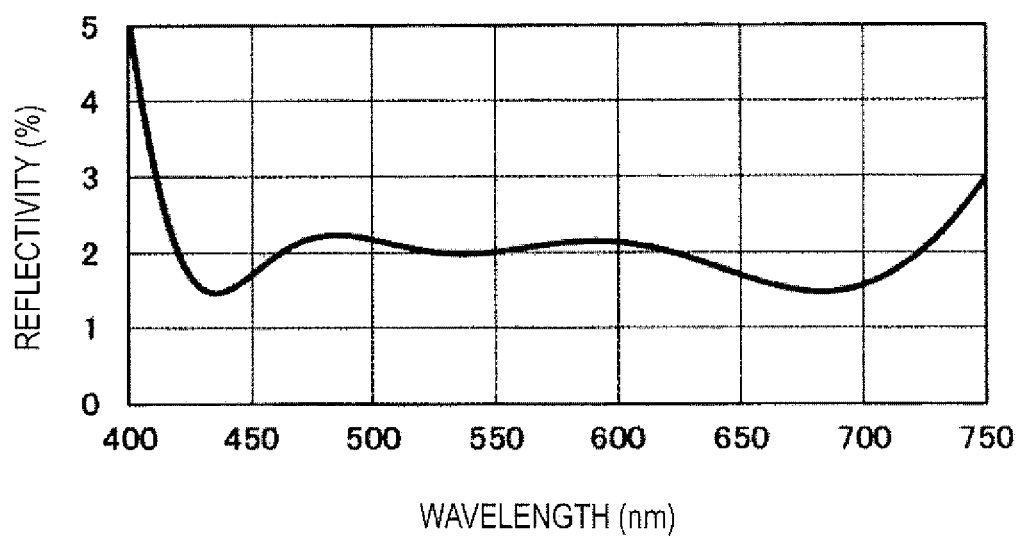
FIG. 6B is a graph showing the reflectivity of the antireflective film of FIG. 6A.

The antireflection effect (on light at an angle of incidence of 56°) of the antireflective film 7A of the related art is a reflectivity of about 2% in the range from 420 to 720 nm as shown in FIG. 6B. In particular, the antireflective film 7A has reflectivities close to 1.5% in the ranges from 430 to 440 nm and from 660 to 700 nm, and reflectivities of approximately 2% in the other ranges.

For example, when the antireflective film 7A is applied to laser light, a reflectivity of about 1.9 to 2% is expected for the first wavelength range from 440 to 470 nm, a reflectivity of about 2% is expected for the second wavelength range of 520 to 550 nm, and a reflectivity of about 2.0 to 1.8% is expected for the third wavelength range from 630 to 660 nm.

Figure 7A:
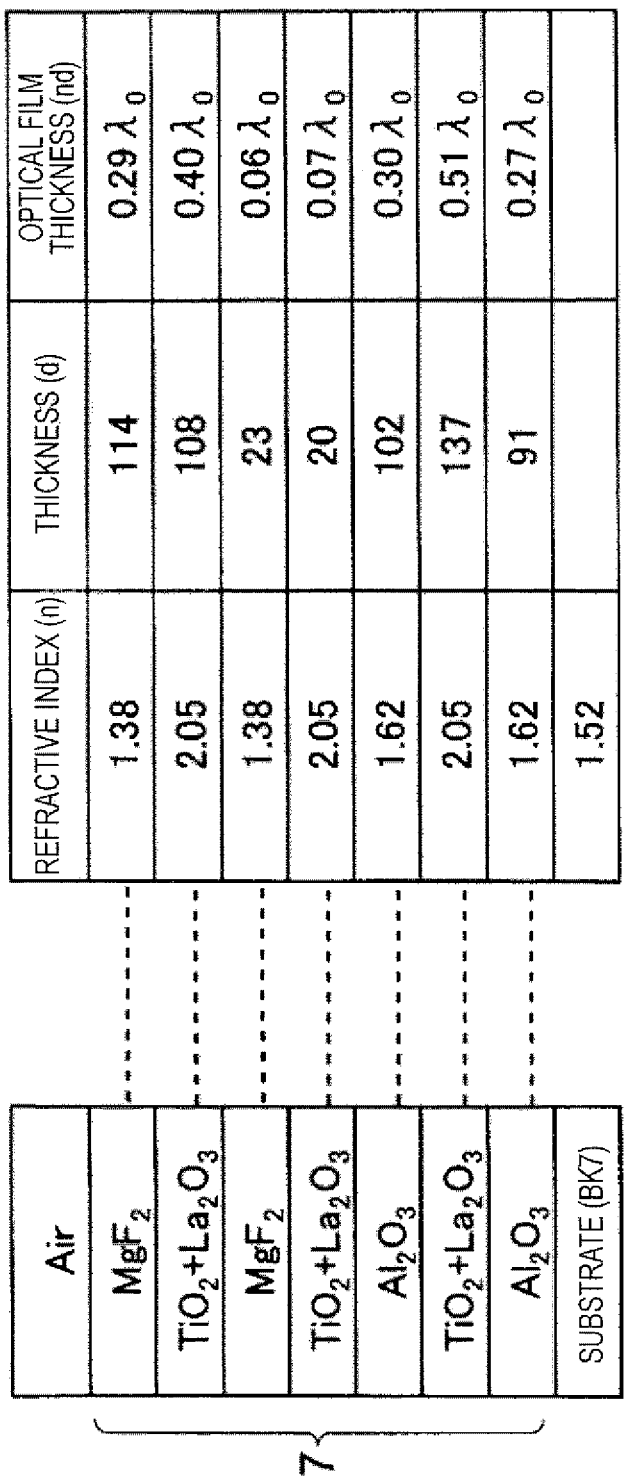
FIG. 7A is an explanatory table showing a configuration of an antireflective film of Example 1 according to an embodiment of the present invention.
Figure 8A:
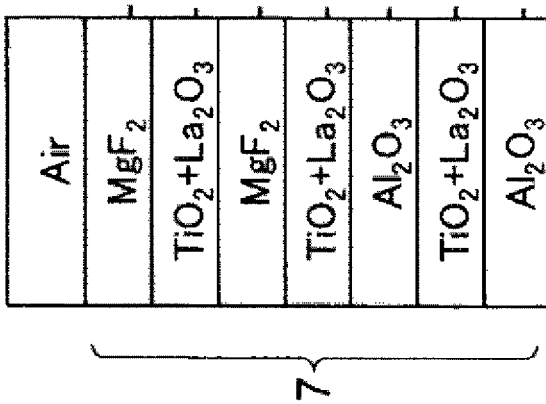
FIG. 8A is an explanatory table showing a configuration of an antireflective film of Example 2 according to an embodiment of the present invention.

As a result of studying production of a better antireflective film in such wavelength ranges of laser light, use of dielectric multiple layers shown in FIGS. 7A, 8A, and 9A is found to produce good antireflection effects.

Example 1

Next, Example 1 of the antireflective film 7 according to the present embodiment will be described with reference to FIGS. 7A and 7B. FIG. 7A shows the configuration and the characteristics of the antireflective film 7 according to Example 1, and FIG. 7B shows the reflectivity of the antireflective film 7.

As shown in FIG. 7A, the antireflective film 7 according to Example 1 has, on a glass substrate, a seven-layer configuration of a laminate of $Al_2O_3$ having a refractive index of 1.62 as first and third layers, a mixed film of $TiO_2$ and $La_2O_3$ having a refractive index of 2.05 as second, fourth and sixth layers, and $MgF_2$ having a refractive index of 1.38 as fifth and seventh layers.

Furthermore, the thicknesses d and the ratios of the optical film thicknesses nd to the designed dominant wavelength $\lambda_0$ of the first to seventh layers are 91 nm and 0.27, 137 am and 0.51, 102 nm and 0.30, 20 nm and 0.07, 23 nm and 0.06, 108 nm and 0.40, and 114 nm and 0.29, respectively.

Figure 7B:
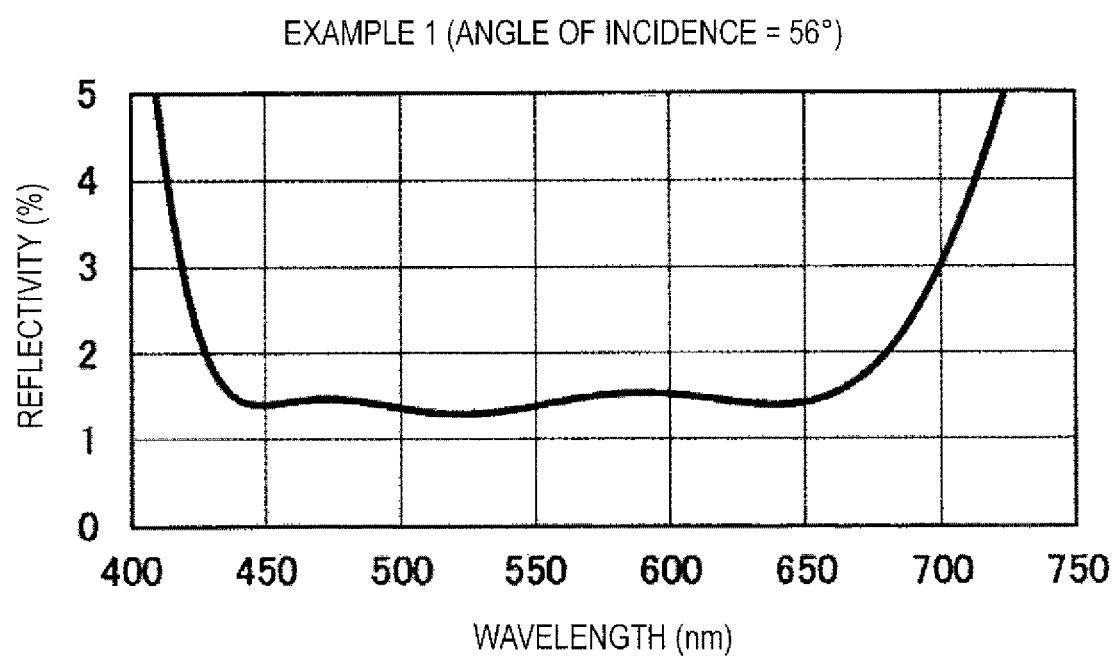
FIG. 7B is a graph showing the reflectivity of the antireflective film of FIG. 7A.

The antireflection effect (on light at an angle of incidence of 56°) of the antireflective film 7 of Example 1 is a reflectivity of about 2% or lower in the range from 430 to 680 nm as shown in FIG. 7B. In particular, the antireflective film 7 has a low reflectivity of about 1.5% in the range from 440 to 660 nm.

Thus, when the antireflective film 7 is applied to laser light, a reflectivity of about 1.5% is expected for the first wavelength range from 440 to 470 nm, a reflectivity of about 1.5% is expected for the second wavelength range of 520 to 550 nm, and a reflectivity of about 1.5% is expected for the third wavelength range from 630 to 660 nm.

Example 2

Next, Example 2 of the antireflective film 7 according to the present embodiment will be described with reference to FIGS. 8A and 8B. FIG. 8A shows the configuration and the characteristics of the antireflective film 7 according to Example 2, and FIG. 8B shows the reflectivity of the antireflective film 7.

As shown in FIG. 8A, the antireflective film 7 according to Example 2 has a seven-layer configuration of the same combination as that of Example 1 described above. Some of the thicknesses of the layers, however, are different.

In Example 2, the thicknesses d and the ratios of the optical film thicknesses nd to the designed dominant wavelength $\lambda_0$ of the first to seventh layers are 76 nm and 0.22, 138 nm and 0.51, 98 nm and 0.29, 27 nm and 0.10, 22 nm and 0.06, 99 nm and 0.37, and 120 nm and 0.30, respectively.

Figure 8B:
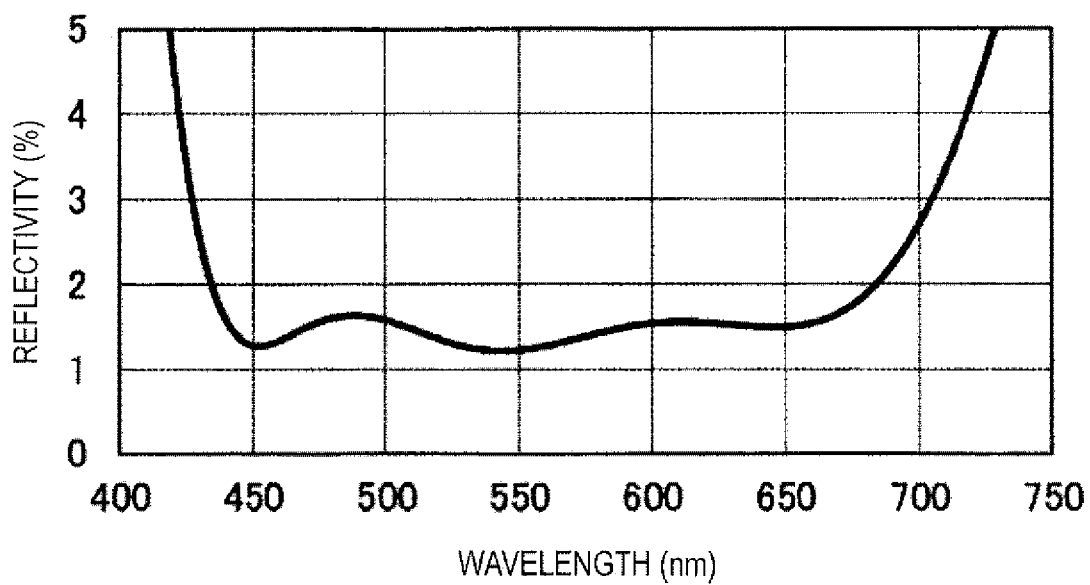
FIG. 8B is a graph showing the reflectivity of the antireflective film of FIG. 8A.

The antireflection effect (on light at an angle of incidence of 56°) of the antireflective film 7 of Example 2 is a reflectivity of 2% or lower in the range from 430 to 680 nm as shown in FIG. 8B. In particular, the antireflective film 7 has a low reflectivity of about 1.5% in the range from 440 to 660 nm.

Thus, when the antireflective film 7 is applied to laser light, a reflectivity of about 1.5% is expected for the first wavelength range from 440 to 470 nm, a reflectivity of about 1.3% is expected for the second wavelength range of 520 to 550 nm, and a reflectivity of about 1.5% is expected for the third wavelength range from 630 to 660 nm.

Example 3

Figure 9B:
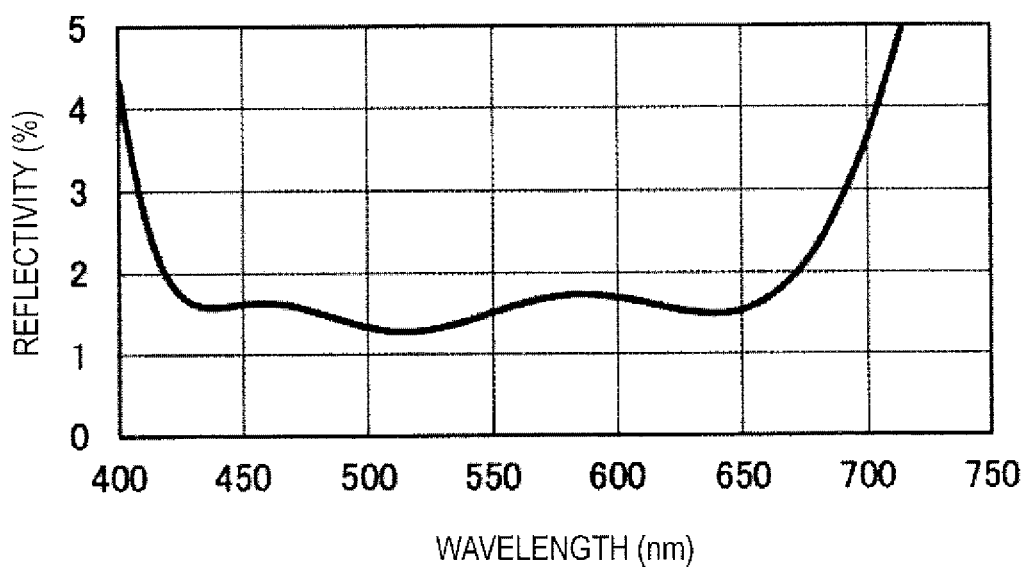
FIG. 9B is a graph showing the reflectivity of the antireflective film of FIG. 9A.

Next, Example 3 of the antireflective film 7 according to the present embodiment will be described with reference to FIGS. 9A and 9B. FIG. 9A shows the configuration and the characteristics of the antireflective film 7 according to Example 3, and FIG. 9B shows the reflectivity of the antireflective film 7.

As shown in FIG. 9A, the antireflective film 7 according to Example 3 has a seven-layer configuration of the same combination as those of Examples 1 and 2 described above. Some of the thicknesses of the layers, however, are different.

In Example 3, the thicknesses d and the ratios of the optical film thicknesses nd to the designed dominant wavelength $\lambda_0$ of the first to seventh layers are 85 nm and 0.25, 132 nm and 0.49, 102 nm and 0.30, 15 nm and 0.06, 27 nm and 0.07, 115 nm and 0.43, and 108 nm and 0.27, respectively.

The antireflection effect on light at an angle of incidence of 56°) of the antireflective film 7 of Example 3 is a reflectivity of 2% or lower in the range from 420 to 670 nm as shown in FIG. 9B. In particular, the antireflective film 7 has a low reflectivity of about 1.5% or lower in the range from 470 to 550 nm.

Thus, when the antireflective film 7 is applied to laser light, a reflectivity of about 1.7% is expected for the first wavelength range from 440 to 470 nm, a reflectivity of about 1.5% is expected for the second wavelength range of 520 to 550 nm, and a reflectivity of about 1.7% is expected for the third wavelength range from 630 to 660 nm.

A result of obtaining an average reflectivity among the first, second and third specific wavelengths range of each of Comparative Example, Example 1, Example 2, and Example 3, and comparing the obtained average reflectivities among the wavelengths is shown in table 1.

TABLE 1

| Average reflectivity among wavelengths | Comparative Example | Example 1 | Example 2 | Example 3 |
|---|---|---|---|---|
| 440-470 nm | 2.13% | 1.48% | 1.55% | 1.63% |
| 520-550 nm | 2.03% | 1.39% | 1.35% | 1.51% |
| 630-660 nm | 1.92% | 1.53% | 1.54% | 1.67% |

As shown in Table 1, in the first wavelength range from 440 to 470, while the reflectivity (average reflectivity among wavelengths) in Comparative example is 2.13%, the reflectivities are 1.48% in Example 1, 1.55% in Example 2, and 1.63% in Example 3. In the second wavelength range from 520 to 550, while the reflectivity in Comparative example is 2.03%, the reflectivities are 1.39% in Example 1, 1.35% in Example 2, and 1.51% in Example 3. In the third wavelength range from 630 to 660, while the reflectivity in Comparative example is 1.92%, the reflectivities are 1.53% in Example 1, 1.54% in Example 2, and 1.67% in Example 3.

Thus, it is found that the reflectivity can be lowered to 2% or lower in all the specific wavelength ranges in the optical system using the illumination light source 1 configured to radiate laser light of predetermined wavelengths by using the antireflective film 7 according to the present embodiment. In particular, according to Example 1, it is confirmed that the reflectivity can be lowered to 1.5% or lower in the first wavelength range from 440 to 470 nm and to 1.4% or lower in the second wavelength range from 520 to 550 nm.

Thus, a result of studying conditions for a dielectric multilayer corresponding to the antireflective film 7 according to the present embodiment will be described below.

The antireflective film 7 according to the present embodiment is made of a dielectric multilayer of three types of materials including a low-refractive-index material having a refractive index of 1.38 lower than a refractive index of 1.52 of the substrate glass (BK7), a medium-refractive-index material having a refractive index of 1.62 a little higher than the refractive index of 1.52 of the substrate glass (BK7), and a high-refractive-index material having a refractive index of 2.05 higher than that of the medium-refractive-index material.

These refractive indices are set so that reflection is prevented by using optical interference due to the difference in the refractive index at the each interface of the laminate and the optical path difference due to the thickness. Thus, it is obvious that the desirable low, medium and high refractive indices vary depending on the refractive index of the substrate glass, and predetermined allowable refractive indices are assumed depending on the range of the refractive index of the substrate glass.

When a standard range of refractive index of the substrate glass is from 1.48 to 1.56, for example, it can be deemed that a refractive index of the low-refractive-index material of 1.38±0.04, a refractive index of the medium-refractive-index material of 1.62±0.04, a refractive index of the high-refractive-index material of 2.05±0.04 can be applied. Since preferable refractive indices and thicknesses can be confirmed through optical simulations, among the respective allowable ranges, it is confirmed that the refractive index of the medium-refractive-index material is 1.62±0.04, the refractive index of the low-refractive-index material is preferably about 1.38±0.02, and the refractive index of the high-refractive-index material is preferably about 2.05±0.1 when the refractive index of the substrate glass is 1.52±0.04.

The ranges of the preferable refractive indices of the respective refractive-index materials can be defined as a condition (1). Condition (1): $1.48 < n_S < 1.56$, $1.36 < n_L < 1.40$, $1.58 < n_M < 1.66$, and $1.95 < n_H < 2.15$ where $n_S$ represents the refractive index of the substrate glass, $n_L$ represents the refractive index of the low-refractive-index material for the designed dominant wavelength, $n_M$ represents the refractive index of the medium-refractive-index material for the designed dominant wavelength, and $n_H$ represents the refractive index of the high-refractive-index material for the designed dominant wavelength.

It is obvious that there are also allowable ranges for the thicknesses $d_1$ to $d_7$ (nm) of the seven layers of the dielectric multilayer for the designed dominant wavelength $\lambda_0$ (550 nm). The thicknesses can also be confirmed through optical simulations. For example, the thickness $d_1$ of the first layer is $0.27\lambda_0$ in Example 1, $0.22\lambda_0$ in Example 2, and $0.25\lambda_0$ in Example 3, and the allowable range thereof is $0.21\lambda_0 \leq n_M \cdot d_1 \leq 0.34\lambda_0$. Furthermore, the thickness $d_2$ of the second layer is $0.51\lambda_0$ in Examples 1 and 2, and $0.49\lambda_0$ in Example 3, and the allowable range thereof is $0.48\lambda_0 \leq n_H \cdot d_2 \leq 0.55\lambda_0$.

Similarly, the thickness $d_3$ of the third layer is 0.29 to 0.30$\lambda_0$ in the Examples and the allowable range thereof is 0.27$\lambda_0 \leq n_M \cdot d_3 \leq 0.37\lambda_0$, the thickness $d_4$ of the fourth layer is 0.06 to 0.10$\lambda_0$ in the Examples and the allowable range thereof is 0.04$\lambda_0 \leq n_H \cdot d_4 \leq 0.12\lambda_0$, the thickness $d_5$ of the fifth layer is 0.06 to 0.07$\lambda_0$ in the Examples and the allowable range thereof is 0.03$\lambda_0 \leq n_L \cdot d_5 \leq 0.07\lambda_0$, the thickness $d_6$ of the sixth layer is 0.37 to 0.43$\lambda_0$ in the Examples and the allowable range thereof is 0.32$\lambda_0 \leq n_H \cdot d_6 \leq 0.44\lambda_0$, and the thickness $d_7$ of the seventh layer is 0.27 to 0.30$\lambda_0$ in the Examples and the allowable range thereof is also 0.27$\lambda_0 \leq n_L \cdot d_7 \leq 0.30\lambda_0$.

Thus, the allowable ranges of the preferable thicknesses are a condition (2), and an antireflective film 7 satisfying both of the conditions (1) and (2) can be obtained. With a configuration satisfying the conditions (1) and (2), the dielectric multilayer 7 capable of reducing unnecessary reflected light in the predetermined wavelength ranges radiated by the illumination light source 1 can be formed.

Next, the materials of the respective refractive indices will be described. In the Examples described above, $Al_2O_3$ is used for the medium-refractive-index material, $MgF_2$ is used for the low-refractive-index material, and a mixture of $TiO_2$ and $La_2O_3$ is used for the high-refractive-index material. The mixture of $TiO_2$ and $La_2O_3$ of the high-refractive-index material is what is called Substance H4 produced by Merck KGaA. Alternatively, $TiZrO_4$ having the same refractive index as the mixture may be used.

With either of the compositions, materials having refractive indices preferable for forming a dielectric multilayer suitable for laser light in the predetermined wavelength ranges radiated by the illumination light source 1 can be obtained.

As described above, the prism for a projection optical system according to the embodiments of the present invention is a prism PR for a projection optical system included in a projector including: an illumination optical system IL configured to guide illumination light I emitted by an illumination light source 1 being configured to radiate blue, green, and red laser light rays to image display devices 11, 12, and 13; and a projection optical system PL configured to project projection light from the image display devices onto a screen through a projection lens, the prism PR for a projection optical system having a first surface (the surface PR1a in the first embodiment, for example) that totally reflects a beam of one of the illumination light I and the projection light P and transmits a beam of the other, and a second surface (the surface PR2a in the first embodiment, for example) that is opposed to the first surface with an air gap therebetween and transmits the beam passing through the first surface. Furthermore, the first surface preferably has an antireflective film 7 (7a) having an average reflectivity of a s-polarized reflectivity and a p-polarized reflectivity at the center angle of the projection light P of 2% or lower in three wavelength ranges including a first wavelength range of blue, a second wavelength range of green, and a third wavelength range of red.

With the configuration as described above, generation of unnecessary reflected light can be suppressed by lowering the reflectivity in the ranges corresponding to the specific wavelength ranges of laser emitted by the illumination light source 1. Thus, according to the embodiments of the present invention, it is possible to obtain a prism PR for a projection optical system capable of reducing reflection of light passing through the prism to improve use efficiency of laser light radiated by the illumination light source 1.

Furthermore, the prism PR for a projection optical system is also preferably provided with an antireflective film 7 (7b) on the second surface PR2a. With such a configuration, generation of unnecessary reflected light can be suppressed by lowering the reflectivity of the projection light P passing through the second surface PR2a opposed to the first surface PR1a with the air gap therebetween. Image degradation due to multiple reflection or the like in the air gap can therefore be suppressed.

Each of the antireflective films 7 (7a, 7b) is preferably a dielectric multilayer having layers of three different refractive indices, which are high, medium, and low refractive indices, includes a laminate of a first layer made of a medium-refractive-index material, a second layer made of a high-refractive-index material, a third layer made of the medium-refractive-index material, a fourth layer made of the high-refractive-index material, a fifth layer made of a low-refractive-index material, a sixth layer made of the high-refractive-index material, and a seventh layer made of the low-refractive-index material in this order from a substrate, and satisfies the following conditions (1) and (2) where a center wavelength of the used wavelength ranges is a designed dominant wavelength. Condition (1): $1.48 < n_S < 1.56$, $1.36 < n_L < 1.40$, $1.58 < n_M < 1.66$, and $1.95 < n_H < 2.15$ where $n_S$ represents the refractive index of a substrate glass, $n_L$ represents the refractive index of the low-refractive-index material for the designed dominant wavelength, $n_M$ represents the refractive index of the medium-refractive-index material for the designed dominant wavelength, and $n_H$ represents the refractive index of the high-refractive-index material for the designed dominant wavelength; and Condition (2): $0.21\lambda_0 \leq n_M \cdot d_1 \leq 0.34\lambda_0$, $0.48\lambda_0 \leq n_H \cdot d_2 \leq 0.55\lambda_0$, $0.27\lambda_0 \leq n_M \cdot d_3 \leq 0.37\lambda_0$, $0.04\lambda_0 \leq n_H \cdot d_4 \leq 0.12\lambda_0$, $0.03\lambda_0 \leq n_L \cdot d_5 \leq 0.07\lambda_0$, $0.32\lambda_0 \leq n_H \cdot d_6 \leq 0.44\lambda_0$, and $0.27\lambda_0 \leq n_L \cdot d_7 \leq 0.30\lambda_0$ where $\lambda_0$ represents the designed dominant wavelength of 550 nm and $d_1$ to $d_7$ represent the physical thicknesses (nm) of the first to seventh layers. With such a configuration, the dielectric multilayer capable of reducing unnecessary reflected light in the predetermined wavelength ranges radiated by the illumination light source 1 can be formed.

Furthermore, the embodiments of the present invention provide an optical system having the prism PR for a projection optical system having the configuration as described above. With this configuration, since the prism PR for a projection optical system having the antireflective films 7 (7a, 7b) having a reflectivity of 2% or lower in the three wavelength ranges including the first wavelength range of blue, the second wavelength range of green, and the third wavelength range of red is used, it is possible to obtain an optical system including the illumination light source 1 configured to radiate laser light and the prism PR for a projection optical system and capable of reducing reflection of light passing through the prism to suppress problems caused by unnecessary reflected light and improve use efficiency of laser light radiated by the illumination light source 1.

As described above, according to the embodiments of the present invention, in an optical system including an illumination light source configured to radiate laser light and a prism for a projection optical system, the prism for a projection optical system capable of reducing reflection of light passing through the prism to suppress problems caused by unnecessary reflected light and improve use efficiency of laser light radiated by the illumination light source and the optical system having the same can be obtained.

The prism for a projection optical system and the optical system having the same according to the embodiments of the present invention can therefore be suitably applied to a large-sized projector requiring use of high power laser light to display images on a large screen.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A prism for a projection optical system included in a projector including: an illumination light source configured to emit laser light rays of blue, green, and red; an illumination optical system configured to guide illumination light from the illumination light source to an image display device; and a projection optical system configured to project projection light from the image display device onto a screen through a projection lens, the prism for the projection optical system comprising:
   a first surface that totally reflects a beam of one of the illumination light and the projection light and transmits a beam of the other; and
   a second surface that is opposed to the first surface with an air gap therebetween and transmits a beam passing through the first surface, wherein
   the first surface has an antireflective film having an average reflectivity of a s-polarized reflectivity and a p-polarized reflectivity at a center angle of a transmitted beam of 2% or lower in three wavelength ranges including a first wavelength range of blue, a second wavelength range of green, and a third wavelength range of red, and
   wherein an angle of incidence of a beam passing through the second surface is 56° when a substrate glass of the prism of the projection optical system has a refractive index of 1.52.

2. The prism for a projection optical system according to claim 1, wherein the second surface is provided with an antireflective film.

3. The prism for a projection optical system according to claim 1, wherein the first wavelength range of blue ranges from 440 to 470 nm, the second wavelength range of green ranges from 520 to 550 nm, and the third wavelength range of red ranges from 630 to 660 nm.

4. The prism for a projection optical system according to claim 3, wherein each of the antireflective films is a dielectric multilayer having layers of three different refractive indices of high, medium, and low refractive indices, includes a laminate of a first layer made of a medium-refractive-index material, a second layer made of a high-refractive-index material, a third layer made of the medium-refractive-index material, a fourth layer made of the high-refractive-index material, a fifth layer made of a low-refractive-index material, a sixth layer made of the high-refractive-index material, and a seventh layer made of the low-refractive-index material in this order from a substrate, and satisfies the following condition (1) where a center wavelength of the used wavelength ranges is a designed dominant wavelength: Condition (1): $1.48 < n_S < 1.56$, $1.36 < n_L < 1.40$, $1.58 < n_M < 1.66$, and $1.95 < n_H < 2.15$ where $n_S$ represents the refractive index of a substrate glass, $n_L$ represents the refractive index of the low-refractive-index material for the designed dominant wavelength, $n_M$ represents the refractive index of the medium-refractive-index material for the designed dominant wavelength, and $n_H$ represents the refractive index of the high-refractive-index material for the designed dominant wavelength.

5. The prism for a projection optical system according to claim 4, wherein each of the antireflective films satisfies the following condition (2): Condition (2): $0.21\lambda_0 \leq n_M \cdot d_1 \leq 0.34\lambda_0$, $0.48\lambda_0 \leq n_H \cdot d_2 \leq 0.55\lambda_0$, $0.27\lambda_0 \leq n_M \cdot d_3 \leq 0.37\lambda_0$, $0.04\lambda_0 \leq n_H \cdot d_4 \leq 0.12\lambda_0$, $0.03\lambda_0 \leq n_L \cdot d_5 \leq 0.07\lambda_0$, $0.32\lambda_0 \leq n_H \cdot d_6 \leq 0.44\lambda_0$, and $0.27\lambda_0 \leq n_L \cdot d_7 \leq 0.30\lambda_0$ where $n_S$ represents the refractive index of a substrate glass, $n_L$ represents the refractive index of the low-refractive-index material for the designed dominant wavelength, $n_M$ represents the refractive index of the medium-refractive-index material for the designed dominant wavelength, $\lambda_0$ represents a designed dominant wavelength of 550 nm and $d_1$ to $d_7$ represent the physical thicknesses (nm) of the first to seventh layers.

6. The prism for a projection optical system according to claim 4, wherein the medium-refractive-index material is $Al_2O_3$, the low-refractive-index material is $MgF_2$, and the high-refractive-index material is a mixture of $TiO_2$ and $La_2O_3$, or $TiZrO_4$.

7. An optical system comprising the prism for a projection optical system according to claim 1.

8. A prism for a projection optical system included in a projector including: an illumination light source configured to emit laser light rays of blue, green, and red; an illumination optical system configured to guide illumination light from the illumination light source to an image display device; and a projection optical system configured to project projection light from the image display device onto a screen through a projection lens, the prism for the projection optical system comprising:
   a first surface that totally reflects a beam of one of the illumination light and the projection light and transmits a beam of the other; and
   a second surface that is opposed to the first surface with an air gap therebetween and transmits a beam passing through the first surface, wherein
   the first surface has a multilayer film capable of reducing reflection, the multilayer film being made of a dielectric multilayer having layers of three different refractive indices of high, medium, and low refractive indices, including a laminate of a first layer made of a medium-refractive-index material, a second layer made of a high-refractive-index material, a third layer made of the medium-refractive-index material, a fourth layer made of the high-refractive-index material, a fifth layer made of a low-refractive-index material, a sixth layer made of the high-refractive-index material, and a seventh layer made of the low-refractive-index material in this order from a substrate, and satisfying the following conditions (1) and (2) where a center wavelength of the used wavelength ranges is a designed dominant wavelength: Condition (1): $1.48 < n_S < 1.56$, $1.36 < n_L < 1.40$, $1.58 < n_M < 1.66$, and $1.95 < n_H < 2.15$ where $n_S$ represents the refractive index of a substrate glass, $n_L$ represents the refractive index of the low-refractive-index material for the designed dominant wavelength, $n_M$ represents the refractive index of the medium-refractive-index material for the designed dominant wavelength, and $n_H$ represents the refractive index of the high-refractive-index material for the designed dominant wavelength; and Condition (2): $0.21\lambda_0 \leq n_M \cdot d_1 \leq 0.34\lambda_0$, $0.48\lambda_0 \leq n_H \cdot d_2 \leq 0.55\lambda_0$, $0.27\lambda_0 \leq n_M \cdot d_3 \leq 0.37\lambda_0$, $0.04\lambda_0 \leq n_H \cdot d_4 \leq 0.12\lambda_0$, $0.03\lambda_0 \leq n_L \cdot d_5 \leq 0.07\lambda_0$, $0.32\lambda_0 \leq n_H \cdot d_6 \leq 0.44\lambda_0$, and $0.27\lambda_0 \leq n_L \cdot d_7 \leq 0.30\lambda_0$ where $\lambda_0$ represents the designed dominant wavelength of 550 nm and $d_1$ to $d_7$ represent the physical thicknesses (nm) of the first to seventh layers, and wherein an angle of incidence of a beam passing through the second surface is 56° when a substrate glass of the prism of the projection optical system has a refractive index of 1.52.

9. The prism for a projection optical system according to claim 8, wherein the medium-refractive-index material is $Al_2O_3$, the low-refractive-index material is $MgF_2$, and the high-refractive-index material is a mixture of $TiO_2$ and $La_2O_3$, or $TiZrO_4$.

10. The prism for a projection optical system according to claim 8, wherein the first surface having the multilayer film has an average reflectivity of a s-polarized reflectivity and a p-polarized reflectivity at a center angle of a transmitted beam of 2% or lower in three wavelength ranges including a first wavelength range of blue, a second wavelength range of green, and a third wavelength range of red.

11. An optical system comprising the prism for a projection optical system according to claim 9.

* * * * *